US010144887B2

United States Patent
Li et al.

(10) Patent No.: US 10,144,887 B2
(45) Date of Patent: Dec. 4, 2018

(54) METHOD OF GASIFYING CARBONACEOUS MATERIAL AND A GASIFICATION SYSTEM

(71) Applicant: CURTIN UNIVERSITY OF TECHNOLOGY, Bentley (AU)

(72) Inventors: Chun-Zhu Li, Cottesloe (AU); Hongwei Wu, Swanbourne (AU); Mohammad Asadullah, Shah-Alam (MY); Xiaoshan Wang, Glen Waverley (AU)

(73) Assignee: CURTIN UNIVERSITY OF TECHNOLOGY (AU)

( * ) Notice: Subject to any disclaimer, the term of this patent is extended or adjusted under 35 U.S.C. 154(b) by 0 days.

(21) Appl. No.: 14/662,152

(22) Filed: Mar. 18, 2015

(65) Prior Publication Data

US 2015/0191664 A1    Jul. 9, 2015

Related U.S. Application Data

(63) Continuation of application No. 13/812,827, filed as application No. PCT/AU2011/000936 on Jul. 26, 2011.

(30) Foreign Application Priority Data

Jul. 27, 2010   (AU) ................. 2010903348
Dec. 6, 2010   (AU) ................. 2010905356

(51) Int. Cl.
  *C10J 3/20*    (2006.01)
  *C10J 3/64*    (2006.01)
  (Continued)

(52) U.S. Cl.
  CPC ............... *C10J 3/66* (2013.01); *C10B 47/06* (2013.01); *C10J 3/20* (2013.01); *C10J 3/32* (2013.01);
  (Continued)

(58) Field of Classification Search
  CPC ...... C01B 2203/1052; C01B 2203/1241; B01J 21/18; B01J 23/745; B01J 23/755;
  (Continued)

(56) References Cited

U.S. PATENT DOCUMENTS 4,141,694 A    2/1979   Camacho
6,178,899 B1 *  1/2001   Kaneko .................. B01D 53/34
                                              110/204
(Continued)

FOREIGN PATENT DOCUMENTS

AU    2010903348    7/2010
AU    2010905356    12/2010
(Continued)

OTHER PUBLICATIONS

International Search Report of PCT/AU2011/000936, dated Sep. 4, 2011, 5 pages.

(Continued)

*Primary Examiner* — Amber R Orlando
*Assistant Examiner* — Syed T Iqbal
(74) *Attorney, Agent, or Firm* — Perkins Coie LLP

(57) ABSTRACT

A method of gasifying carbonaceous material is described. The method comprises a first step of pyrolyzing and partially gasifying the carbonaceous material to produce volatiles and char. The volatiles and the char are then separated and, subsequently, the char is gasified and the volatiles are reformed. The raw product gas is then finally cleaned with char or char-supported catalysts or other catalysts.

27 Claims, 4 Drawing Sheets

(51) Int. Cl.
  C10J 3/66     (2006.01)
  C10K 3/02     (2006.01)
  C10J 3/32     (2006.01)
  C10J 3/38     (2006.01)
  C10J 3/62     (2006.01)
  C10J 3/72     (2006.01)
  C10K 3/00     (2006.01)
  C10K 3/04     (2006.01)
  C10B 47/06    (2006.01)
  B01J 21/18    (2006.01)
  B01J 23/745   (2006.01)
  B01J 23/755   (2006.01)

(52) U.S. Cl.
  CPC . *C10J 3/38* (2013.01); *C10J 3/62* (2013.01); *C10J 3/64* (2013.01); *C10J 3/721* (2013.01); *C10K 3/00* (2013.01); *C10K 3/006* (2013.01); *C10K 3/02* (2013.01); *C10K 3/023* (2013.01); *C10K 3/04* (2013.01); *B01J 21/18* (2013.01); *B01J 23/745* (2013.01); *B01J 23/755* (2013.01); *C10J 2200/09* (2013.01); *C10J 2300/094* (2013.01); *C10J 2300/0916* (2013.01); *C10J 2300/0956* (2013.01); *C10J 2300/0973* (2013.01); *C10J 2300/1246* (2013.01); *Y02P 20/52* (2015.11)

(58) Field of Classification Search
  CPC ............ C10B 47/06; C10J 2200/09; C10J 2300/0916; C10J 2300/094; C10J 2300/0956; C10J 2300/0973; C10J 2300/1246; C10J 3/20; C10J 3/32; C10J 3/38; C10J 3/62; C10J 3/64; C10J 3/66; C10J 3/721; C10K 3/00; C10K 3/006; C10K 3/02; C10K 3/023; C10K 3/04; Y02P 20/52
  See application file for complete search history.

(56) References Cited

U.S. PATENT DOCUMENTS 6,403,049 B1 * 6/2002 Van Keulen ............ C01B 3/16
                                                 252/373
2005/0247553 A1 * 11/2005 Ichikawa ............... C10J 3/66
                                                  202/96
2007/0169412 A1    7/2007 Sinquefield et al.
2011/0308155 A1 * 12/2011 Paskach ............... C10J 3/463
                                                   48/77

FOREIGN PATENT DOCUMENTS

| CN | 1233643 | 11/1999 |
|---|---|---|
| CN | 1699512 | 11/2005 |
| CN | 201459073 | 5/2010 |
| DE | 199 28 581 | 1/2001 |
| DE | 10 2007 062 414 | 7/2009 |
| EP | 1 142 981 | 10/2001 |
| EP | 1 371 713 | 12/2003 |
| JP | 2002-210444 | 1/2001 |
| JP | 2003503171 | 1/2003 |
| JP | 2004-153359 | 5/2004 |
| JP | 200536108 | 4/2005 |
| JP | 2005-207643 | 8/2005 |
| JP | 2005-272530 | 10/2005 |
| JP | 2005336233 | 12/2005 |
| JP | 3781379 | 5/2006 |
| JP | 2007-237135 | 9/2007 |
| JP | 2009-057497 | 3/2009 |
| JP | 2009-533514 | 9/2009 |
| WO | WO2009/080336 | 7/2009 |
| WO | WO 2010/022741 | 3/2010 |

OTHER PUBLICATIONS

Extended European Search Report of related copending EP Application EP 11 81 1636, dated Mar. 6, 2014, 9 pages.
Oct. 21, 2013 First Office Action with English translation issued in related co-pending Chinese Application No. 2011800455725, 22 pages.
Corella et al., Energy & Fuels 13: 1122-1127 (1999).
Devi et al., Fuel Processing Technology 86: 707-730 (2005).
Dayton, A Review of the Literature on Catalytic Biomass Tar Destruction, Milestone Completion Report, pp. 1-33 (Dec. 2002).
Kuhn et al., Applied Catalysis B. Environmental 81:14-26 (2008).
Xu et al., Fuel 89: 1734-1795 (2010).

* cited by examiner

METHOD OF GASIFYING CARBONACEOUS MATERIAL AND A GASIFICATION SYSTEM

CROSS REFERENCE TO RELATED APPLICATIONS

This application is a continuation application of U.S. patent application Ser. No. 13/812,827 filed Aug. 8, 2013 which is a 35 USC § 371 application of International Application No. PCT/AU2011/000936 filed Jul. 26, 2011, which claims priority to Australian Patent Application Nos. AU2010903348 filed Jul. 27, 2010 and AU2010905356, filed Dec. 6, 2010, which are hereby incorporated by reference in their entirety.

FIELD OF THE INVENTION

The present invention relates to a method of gasifying carbonaceous material and a gasification system.

BACKGROUND OF THE INVENTION

Gasification refers to the conversion of a solid or liquid material, such as a carbonaceous material, into a gaseous fuel. Gasification is of interest for many low-emission technologies in chemical and energy industries.

Gasification of a carbonaceous material can be conceptually divided into two steps although a clear distinction between the two steps is not possible. As the (solid) carbonaceous material is heated up, a mixture of gas and vapour ("volatiles"), including moisture of the carbonaceous material, is released from the carbonaceous material, leaving a solid residue ("char"). Both the volatiles and the char then react with gasifying agents such as $H_2O$ and $O_2$ to form a product gas.

Low-rank carbonaceous fuels such as brown coal (lignite), peat, biomass and solid wastes are particularly suitable for gasification due to their high gasification reactivities. However, these low-rank fuels have several specific properties, which must be considered in the design and operation of a gasifier for gasifying these low-rank fuels.

Firstly, low-rank fuels generally have high volatile yields, for example, 80 wt % or more (on dry basis) for some types of biomass. The complete reforming of the tarry components of the volatiles is one of the most important considerations in the design of a gasifier because the removal of tar is cumbersome and costly.

Secondly, low rank fuels often contain well-dispersed alkali and alkaline earth metallic (AAEM) species that can volatilise easily during pyrolysis and gasification. The volatilised AAEM species in the gasification product gas can cause corrosion/erosion of turbine/engine components. The volatilised AAEM species may also react with the bed materials (e.g. sand) in a fluidised-bed gasifier, resulting in the agglomeration and de-fluidisation of the bed materials. On the other hand, if these AAEM species are retained in the char, they can be excellent catalysts for the gasification of char.

Thirdly, char and volatiles from low-rank fuels are very reactive. The interaction between the char and volatiles can enhance the volatilisation of their inherent metallic species (e.g. Na in brown coal and K in biomass), deactivate the char structure and thus reduce the char reactivity. In the worst case, the volatile-char interactions may practically terminate the gasification of char. In the presence of volatile-char interactions, increasing the gasification temperature does not always lead to significant improvement in the gasification rates. In fact, the volatile-char interactions impact almost every aspect of gasification.

The consumption of oxygen is an important consideration in the design and operation of a gasifier to achieve high efficiency. In many gasifiers volatiles, being more reactive than char, tend to react preferentially with $O_2$, leaving the less reactive char to be gasified slowly with steam and other gasifying agents. A more desirable situation would be for the less reactive char to react with $O_2$ enabling the more reactive volatiles to be reformed with steam and other gasifying agents.

The raw product gas may contain traces of tar, volatilised inorganic species (e.g. alkali) and pollutant-forming species (e.g. $NH_3$, HCN and $H_2S$). It normally needs to be cleaned before it can be used, for example, as a gaseous fuel in a turbine/engine or as a feedstock for chemical synthesis. The removal of various undesirable components such as tarry materials, AAEM vapour, particulates and $H_2S/NH_3/HCl$ from the gasification product gas normally adds to the overall gasification process complexity and forms an important portion of the overall gasification capital and operating costs. When these undesirable species are removed through liquid (e.g. water) scrubbing, a liquid waste stream is generated that must be further treated at great expense. Various conventional catalysts may be employed to reform tar. However, these catalysts often deactivate easily.

There is therefore a need for technological advancement.

SUMMARY OF THE INVENTION

In accordance with one aspect of the present invention, there is provided a method of gasifying a carbonaceous material, the method comprising the steps of:
  pyrolysing the carbonaceous material to produce volatiles and char;
  separating the char and the volatiles;
  gasifying the char;
  reforming the volatiles to produce a product gas; and
  passing partially reformed volatiles and/or product gas through a product gas cleaning zone, such as a catalyst bed.

Passing partially reformed volatiles and/or product gas through a catalyst bed results in several effects including the removal of tar residues and other impurities such as inorganic contaminants, and increasing the hydrogen content of the product gas by performing the water-gas-shift reaction, thereby producing a clean product gas.

The catalyst bed may comprise a moving bed of char or char-supported catalyst. The moving bed may be a non-isothermal moving bed of char or char-supported catalyst. The char or char-supported catalysts may be prepared from the pyrolysis and/or partial gasification of the carbonaceous material (including that loaded with catalytic species). In one example the process comprises the step of discharging spent char or char-supported catalyst from the catalyst bed and gasifying the spent char or char-supported catalyst to recover their energy values. The spent or partially spent char or char-supported catalysts may also be returned to the field as a soil conditioner, a source of nutrients and/or for carbon biosequestration.

In another embodiment, the catalyst bed is one of a series of catalyst beds.

In one embodiment of the invention, the step of pyrolysing the carbonaceous material comprises pyrolysing the carbonaceous material for a period of time that is sufficiently long to convert substantially all the carbonaceous material to volatiles and char.

In an embodiment, the step of pyrolysing the carbonaceous material comprises heating the carbonaceous material with a counter-current stream of hot gas. The hot gas may be produced from gasifying the char. The carbonaceous material may undergo simultaneous pyrolysis and (partial) gasification.

In one embodiment, the step of gasifying the char comprises reacting the char with a gasifying agent. The step of gasifying the char may comprise reacting the char with a controlled amount of an oxygen-containing gas. The step of gasifying may be performed in isolation from the step of reforming the volatiles to minimise volatile-char interactions.

In accordance with a further aspect of the present invention, there is provided a method of treating raw product gas produced from gasification of low-rank carbonaceous materials, wherein the raw product gas contains partially reformed volatiles, tar residues and contaminants, the method comprising passing the raw product gas through a catalyst bed.

In one embodiment, the method of treating the raw product gas comprises passing the raw product gas through a catalyst bed that comprises a moving bed of char or char-supported catalyst. Tar residues and other impurities such as inorganic contaminants are removed from the raw product gas. Additionally, the hydrogen content of the treated product gas in comparison to the raw product gas is increased by performing the water-gas-shift reaction.

The method may comprise the step of drying the carbonaceous material prior to pyrolysing the carbonaceous material. For embodiments wherein the method comprises the step of drying the carbonaceous material, steam produced from the drying step may be employed in the step of reforming the volatiles.

In accordance with a further aspect of the present invention, there is provided a gasification system for gasifying a carbonaceous material, the gasification system comprising:
 a reforming zone for reforming volatiles to produce a product gas;
 a char gasification zone for gasifying char;
 a pyrolysis zone for pyrolysing carbonaceous material, the pyrolysis zone being in fluid communication with the reforming zone and the char gasification zone in an arrangement whereby volatiles and char formed in the pyrolysis zone are separated and directed to the reforming zone and the char gasification zone, respectively; and
 a product gas cleaning zone in fluid communication with the reforming zone in an arrangement whereby partially reformed volatiles and/or product gas can be passed through the product was cleaning zone.

In this way, the gasification system of the present invention reduces and typically minimises volatile-char interactions.

In one embodiment, the pyrolysis zone is disposed intermediate to the reforming zone and the char gasification zone.

In one embodiment, the product gas cleaning zone comprises a catalyst bed. It will be appreciated that the catalyst bed may comprise more than one catalyst beds arranged in series.

In various embodiments of the invention, the gasification system may be provided with an inlet for introduction of carbonaceous material into the pyrolysis zone, and one or more inlets for introduction of gasifying agents, such as steam and an oxygen-containing gas, into the char gasification zone. The gasification system may also be provided with an outlet for withdrawing product gas from the catalyst bed.

In one embodiment, the gasification system comprises a gasification vessel having defined therein the reforming, char gasification and pyrolysis zones.

In one embodiment of the invention, the char gasification zone is disposed in a lower portion of the gasification vessel. The reforming zone may be disposed in an upper portion of the gasification vessel.

In an embodiment, the char gasification zone is further provided with an ash discharging device, such as a locked hopper, operatively connected to an outlet disposed in a lower portion of the gasification vessel.

In one embodiment of the invention, the pyrolysis zone is configured to retain the carbonaceous material in the pyrolysis zone for a residence time of sufficient length to convert substantially all the carbonaceous material to volatiles and char.

The pyrolysis zone may be provided with a pyrolyser adapted to retain the carbonaceous material in the pyrolysis zone for a residence time of sufficient length to convert substantially all the carbonaceous material to volatiles and char.

In one embodiment, a portion of the char formed in the pyrolysis zone is separated from the remaining carbonaceous material as a gas cleaning catalyst and directed to the product gas cleaning zone.

In one embodiment, the gasification system comprises a separate vessel, such as a moving-bed reactor, for pyrolysing and/or partially gasifying a carbonaceous material so as to prepare char or char-supported catalysts, the system being arranged so as to allow the pyrolysed and/or partially gasified carbonaceous material to be discharged into the product cleaning zone to act as the catalysts for the cleaning of the product gas. The carbonaceous material may be the main feedstock for gasification.

The product gas cleaning zone may coincide with the char gasification zone, which may be configured and operated under conditions whereby char may undergo partial or complete gasification. The char gasification zone may also be a separate vessel, including char storage.

In accordance with a further aspect of the present invention, there is provided an apparatus for pyrolysing and partially gasifying carbonaceous materials the apparatus comprising:
 at least one element having a surface arranged such that, when the apparatus receives carbonaceous material, the received carbonaceous material is in contact with the surface for a time period of sufficient length so as to pyrolyse the carbonaceous material;
 wherein the apparatus is arranged such that the surface receives heat for pyrolysing and partially gasifying the carbonaceous material.

In one embodiment, the surface has a downwardly sloping portion arranged so as to assist in contacting the carbonaceous material with the surface for the time period.

The apparatus may comprise a plurality of surfaces, each surface being arranged to receive carbonaceous material such that the received carbonaceous material is in contact with the respective surface for a time period of sufficient length so as to pyrolyse the carbonaceous material, each surface being arranged to receive heat for pyrolysing and partially gasifying the carbonaceous material. The plurality of surfaces may be in a cascade arrangement and the apparatus may be arranged such that carbonaceous material is transferred to successive surfaces of the cascade arrangement after a period of time of sufficient length so as to pyrolyse the carbonaceous material.

In one embodiment, the apparatus comprises an agitator associated with at least one element, the agitator being arranged so as to agitate carbonaceous material in contact with the surface so as to transfer the carbonaceous material to a region below the surface.

In embodiments wherein the apparatus comprises the plurality of surfaces in the cascade arrangement, the agitator may be arranged so as to transfer the carbonaceous material to a successive surface of the cascade arrangement.

In one embodiment, the apparatus comprises a plurality of agitators, each agitator being associated with a respective element having a respective surface, each agitator being arranged so as to transfer the carbonaceous material to a successive surface of the cascade arrangement or, in the case of a last surface of the cascade arrangement, to a region below the last surface of the cascade arrangement.

The plurality of surfaces may be arranged in a vertical cascade arrangement and the apparatus may comprise a rotatable shaft extending vertically through the plurality of surfaces wherein agitators associated with respective surfaces are operable by rotation of the rotatable shaft.

Each successive surface of the vertical cascade arrangement may have a downwardly sloping portion that is shaped in a complementary manner to the surface thereabove.

BRIEF DESCRIPTION OF THE FIGURES

Embodiments of the present invention will now be described, by way of example only, with reference to the accompanying figures, in which.

DETAILED DESCRIPTION

Embodiments of the present invention relate to a method 19 of gasifying a carbonaceous material, a gasification system 20, 40, and an apparatus 30 for pyrolysing carbonaceous material as described with reference to FIGS. 1 to 4.

It will be appreciated that the method 10 may be performed in a gasification vessel having integrally defined therein a pyrolysis zone for pyrolysing carbonaceous material, a char gasification zone for gasifying the char with steam and an oxygen containing gas, a reforming zone for reforming volatiles with steam to produce a product gas, and a gas cleaning zone to clean the product gas. An embodiment of the gasification vessel in accordance with the present invention will be described in more detail in later pages in the description.

Figure 1:
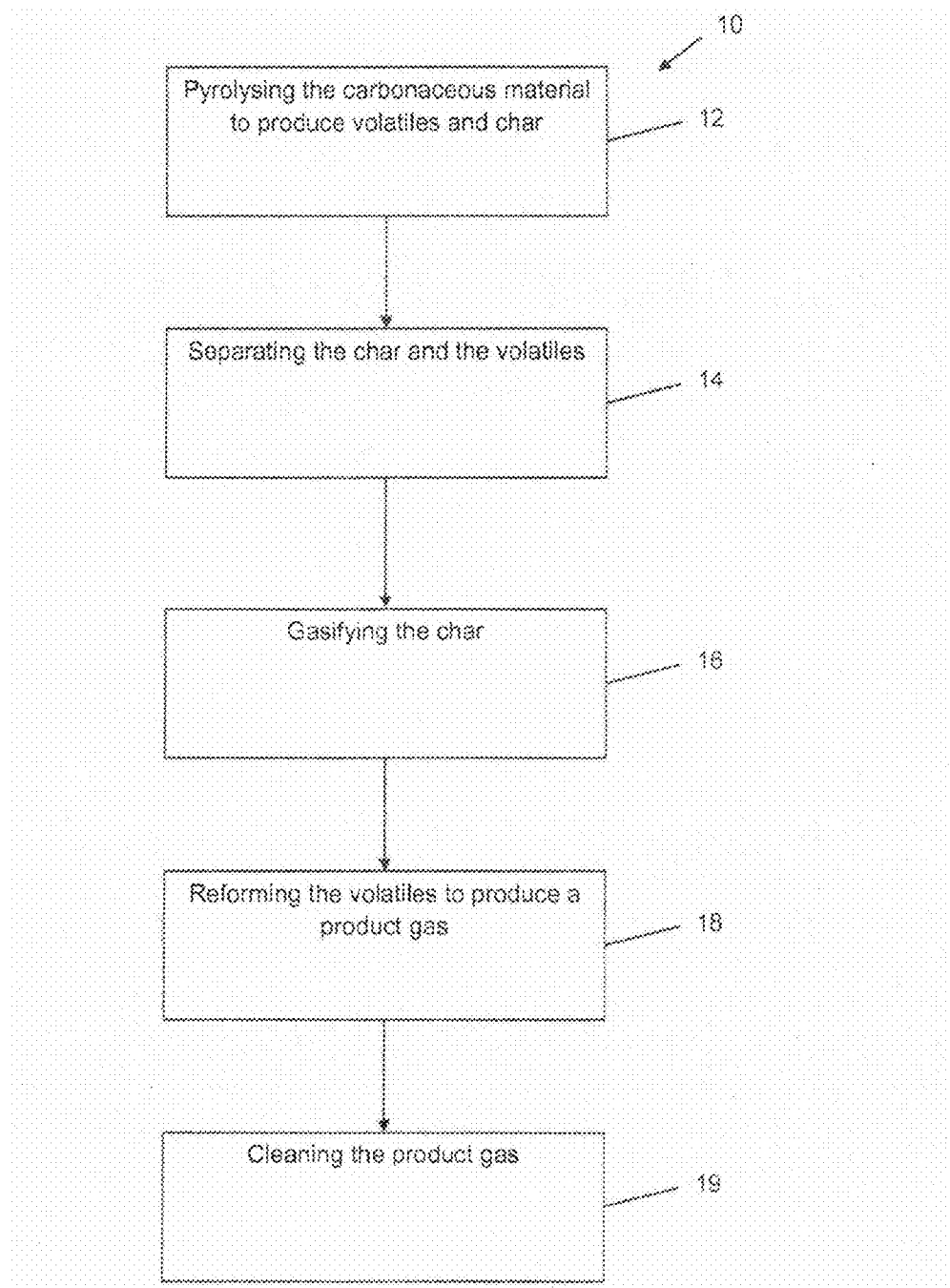
FIG. 1 is a schematic diagram of a method of gasifying a carbonaceous material in accordance with an embodiment of the present invention.

In its broadest form, and as shown in FIG. 1, the gasification method 10 comprises the steps of pyrolysing 12 the carbonaceous material to produce volatiles and char, separating 14 the char and the volatiles, gasifying 16 the char, reforming 18 the volatiles to produce a product gas, and cleaning 19 the product gas.

Figure 3:
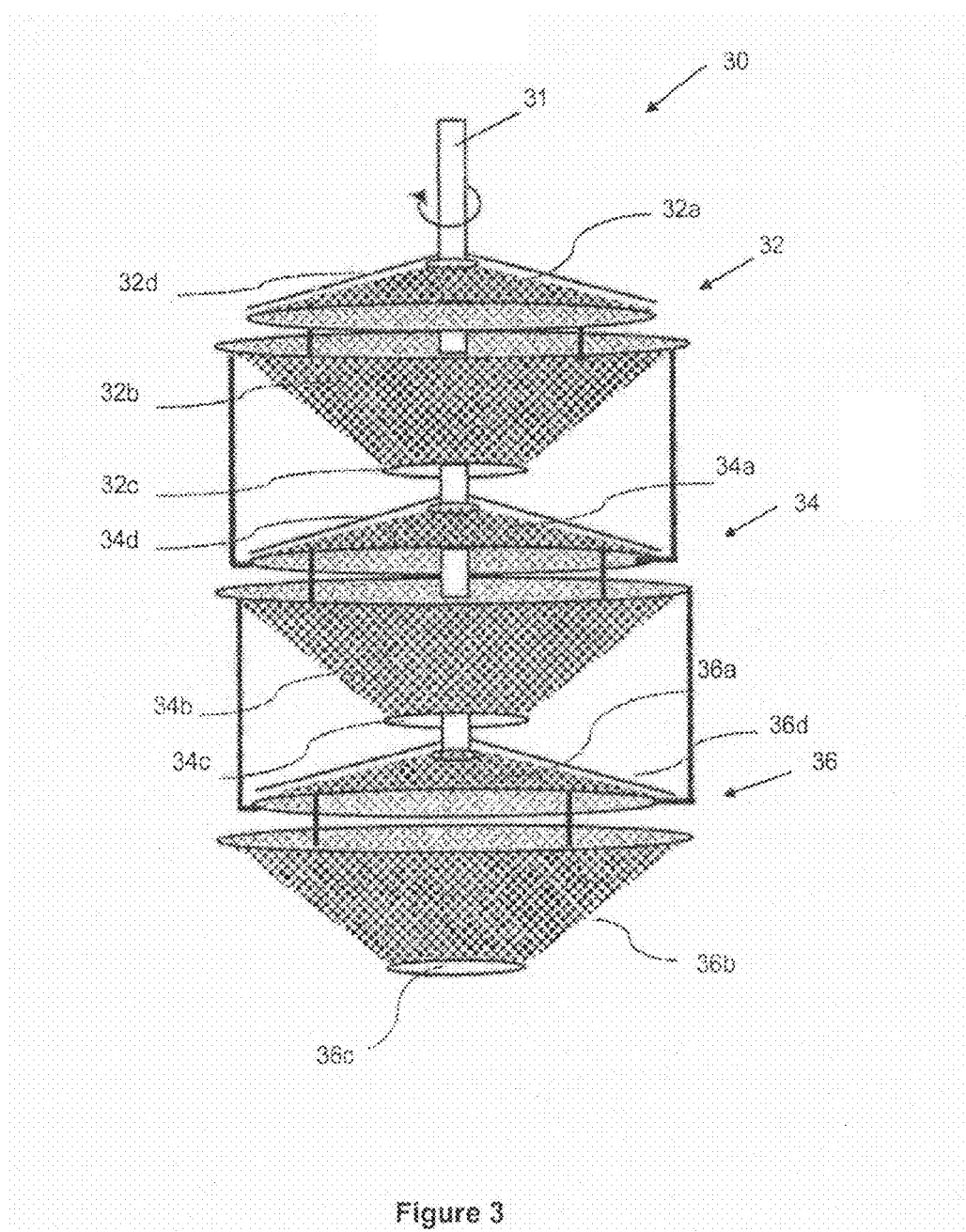
FIG. 3 is a schematic diagram of one embodiment of an apparatus for pyrolysing a carbonaceous material which may be used in the gasification system shown in FIG. 2.
Figure 4:
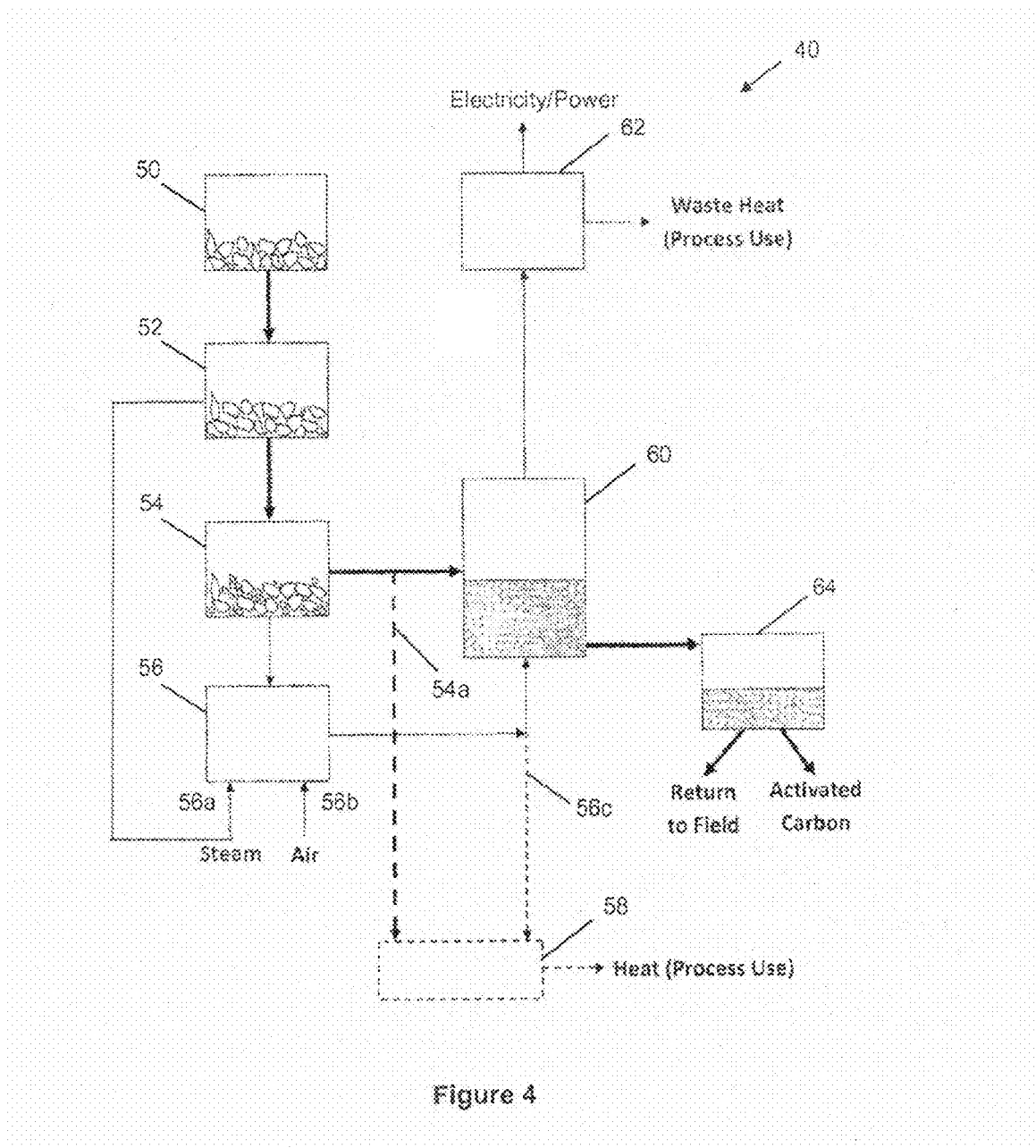
FIG. 4 is a schematic diagram of a gasification system for gasifying a carbonaceous material so as to produce char and a product gas in accordance with one embodiment of the present invention.

The term 'carbonaceous material' is used in the broadest terms throughout this specification and includes, but is not limited to, coal such as anthracite, bituminous coal, sub-bituminous coal, brown coal lignite and peat, biomass, waste rubber including but not limited to vehicle tyres, waste plastic materials, agricultural waste, mixtures thereof and mixtures of said carbonaceous materials with other substances. The method and system of the embodiments of present invention described with reference to FIGS. 1 to 4 are particularly suitable for use with low-rank carbonaceous material having high volatile matter yields and high moisture contents. The system described with reference to FIG. 4 is especially suitable for use with biomass having high volatile matter yields and high moisture contents.

In embodiments wherein the moisture content of the carbonaceous material is high, such as in biomass, it is preferable to dry the carbonaceous material prior to pyrolysing the carbonaceous material. The advantages of pre-drying the carbonaceous material are two-fold. Pre-drying minimises agglomeration of particles of carbonaceous material in storage hoppers and the gasification vessels.

Additionally, while it is preferable that a certain amount of moisture be inherently introduced into the gasification vessel with the carbonaceous material, and subsequently be converted to steam for use in the reforming zone, an excess amount of moisture would increase the energy requirements within the gasification vessel to convert the moisture to steam and would result in decreased efficiencies.

Accordingly, in one embodiment, the method 10 comprises a step of drying the carbonaceous material prior to pyrolysing the carbonaceous material.

In one form of the invention, drying the carbonaceous material comprises contacting the carbonaceous material with the product gas of the process in an indirect heat exchange arrangement. Indirect heat exchange with the product gas may be achieved by passing the carbonaceous material through a conventional indirect dryer, such as will be known to those skilled in the art. In this way the sensible heat of the product gas may be efficiently used in the method 10.

In one embodiment of the method 10, pyrolysing the carbonaceous material involves introducing a continuous flow of carbonaceous material into a pyrolysis zone of a gasification vessel. To facilitate a continuous flow of carbonaceous material into the pyrolysis zone and to minimise particle agglomeration, it is preferable to control the moisture content of the carbonaceous material, as described above, and the particle size of the carbonaceous material.

Pyrolysing the carbonaceous material comprises heating the carbonaceous material, preferably by directly heating the carbonaceous material with a hot gas. The hot gas may be produced in the char gasification zone of the gasification vessel and is directed in counter-current direct heat exchange with the continuous flow of carbonaceous material in the pyrolysis zone. The temperature of the hot gas depends on the type of carbonaceous material, and may be in a temperature range of about 900° C. to about 1200° C. The carbonaceous material may undergo simultaneous pyrolysis and partial gasification through reactions with the hot gas stream.

In a preferred embodiment, the continuous flow of carbonaceous material descends progressively through the pyrolysis zone for a period of sufficient length to ensure substantially complete pyrolysis of the carbonaceous material to volatiles and char. In one embodiment, the continuous flow of carbonaceous material descends progressively through the pyrolysis zone by gravity. In an alternative embodiment, the continuous flow of carbonaceous material descends progressively through the pyrolysis zone by a transfer means, such as an auger, a screw, a moving bed, or an agitation means associated with a pyrolyser, such as for example will be described with reference to FIG. 3.

Following pyrolysis, the volatiles ascend into a reforming zone of the gasifier while the char descends into a gasification zone of the gasifier. Advantageously, the complete pyrolysis of the carbonaceous material to volatiles and char enables the improved separation of volatiles and char to the reforming zone and char gasification zone, respectively, thereby minimising the interactions between volatiles and char in the char gasification zone. Consequently, the substantial absence of volatiles in the char gasification zone facilitates a relative increase in the rate of char gasification in comparison to prior art processes. In the substantial absence of volatiles, oxygen is mainly consumed by char, facilitating the rapid gasification of char that is normally the rate-limiting step. Therefore, embodiments of the present invention increase the gasification rates with minimal amounts of oxygen to achieve high gasification efficiency.

Gasifying the char comprises introducing gasifying agents, such as steam and an oxygen-containing gas, into the char gasification zone and reacting the char with the steam and the oxygen-containing gas.

In one embodiment of the invention, the oxygen containing gas introduced into the char gasification zone may comprise air, pure oxygen or diluted oxygen. The exothermic reactions between oxygen and char may be represented with simplified reactions as follows:

$$C + \tfrac{1}{2}O_2 \rightarrow CO \qquad (1)$$

$$C + O_2 \rightarrow CO_2 \qquad (2)$$

The endothermic reaction between steam and char can be shown with a simplified reaction:

$$C + H_2O \rightarrow CO + H_2 \qquad (3)$$

The amount of oxygen-containing gas and/or steam introduced into the char gasification zone may be varied, respectively, to control the operating temperature of the char gasification zone.

The operating temperature required can be determined based on energy balance within the gasification vessel among various zones, including the catalyst bed for product gas cleaning. In order to achieve high gasification efficiency, the feeding rate of oxygen into the char gasification zone is preferably as low as practical.

In one embodiment, the char is substantially consumed in the char gasification zone, resulting in the production of hot gas and ash. The ash may be discharged from the char gasification zone of the gasification vessel by means of an ash-discharging device, such as a locked hopper.

The hot gas resulting from char gasification provides a heat source for heating and pyrolysing carbonaceous material in the pyrolysis zone of the gasification vessel, for reforming volatiles in the reforming zone and for cleaning the product gas in the gas cleaning zone.

It will be appreciated that, in the case of insufficient char to balance the heat demand, including the 'start-up' mode, part of the product gas produced in the method 10 could be recycled and burned in the char gasification zone or burned in the reforming zone.

The hot gas flows from the char gasification zone to the pyrolysis zone and passes in counter-current direct heat exchange with the carbonaceous material as it progressively moves through the pyrolysis zone and is pyrolysed. As the hot gas passes through the pyrolysis zone, the hot gas mixes with volatiles (including steam) released from the carbonaceous material and flows into the reforming zone. In this way, the hot gas assists the separation of volatiles from char produced in the pyrolysis zone.

The hot gas also satisfies the energy demands of endothermic volatile reforming reactions in the reforming zone. In the reforming zone, volatiles and steam endothermically react to produce a product gas. In one embodiment, reforming the volatiles with steam in the reforming zone is performed at a temperature in a range of about 700° C. to about 1000° C. Advantageously, therefore, part of the sensible heat of the hot gas produced in the char gasification zone is recuperated into chemical energy in the form of the product gas.

The excess gasifying agents in the above mentioned hot gas would contact and react with the pyrolysing feedstock, its volatiles and char as it flows upwards.

The product gas produced in the reforming zone may contain organic and inorganic contaminants. Examples of contaminants include, but are not limited to, tar residues, $NH_3$, HCN, $H_2S$, and volatilised inorganic AAEM species. A product gas that contains contaminants is often referred to as a 'raw product gas'.

The method 10 conveniently removes organic and inorganic contaminants from the product gas.

In one embodiment of the invention, the method 10 further comprises passing the partially reformed volatiles and/or product gas through a catalyst bed.

In one embodiment, the catalyst bed comprises a non-isothermal moving bed of catalyst. In another embodiment, the catalyst bed is a plurality of fluidly interconnected beds arranged in series.

In one embodiment, the catalyst comprises a transition metal catalyst supported on a carbonaceous material substrate. This may be produced from the pyrolysis and/or partial gasification of the carbonaceous material containing or impregnated with the metal. Alternatively, the metal may be loaded/impregnated into the char following such methods commonly known to those skilled in the field. In a preferred embodiment, the catalyst comprises Fe and/or Ni supported on char. In another embodiment, the catalyst may be the char itself. Advantageously, the char produced from the pyrolysis of biomass contains abundant inherent catalytic species, particularly AAEM species, that are well dispersed inside the char. Accordingly, the char produced from pyrolysis may be used for catalysing the decomposition of tar residues in the product gas. In the cases of char or char-supported catalysts, the catalysts may be produced from the pyrolysis of a carbonaceous material in a vessel (e.g. a moving-bed) and then fed into the gas cleaning zone. The carbonaceous material can be the feedstock (e.g. biomass) to be gasified. In another preferred embodiment, the catalyst comprises a (treated) iron core such as ilmenite.

The catalyst bed may be integral with the gasification vessel and in fluid communication with the reforming zone. In certain embodiments wherein the catalyst comprises a char or char-supported catalyst, spent catalyst may be discharged into the char gasification zone of the gasification vessel and subsequently gasified. In this way, no additional solid or liquid waste streams arise from treating the contaminated product gas as described above.

Passing partially reformed volatiles and/or product gas through a catalyst bed removes inorganic contaminants therefrom. Volatilised AAEMs condense on the solid catalyst surface at an appropriate temperature, and the particulates are also caught by the catalyst bed. Other inorganic contaminants such as $NH_3$, $H_2S$ and other Cl- or S-containing compounds are decomposed or adsorbed through contact with the solid catalyst. In this way, inorganic contaminants such as AAEMs are captured onto the catalyst. Advantageously, the AAEMs enhance the reactivity of char in the char gasification zone. Accordingly, the method 10 provides a means by which inorganic contaminants from the volatiles generated from low-rank carbonaceous materials may be conveniently utilized to enhance char gasification. The AAEMs subsequently report to ash.

Passing partially reformed volatiles and/or product gas through the catalyst bed also removes organic contaminants, such as tar residues, by catalysed reforming reactions e.g. with steam. Advantageously, this recuperates the thermal energy (sensible heat) into the chemical energy of the reforming products. Some tar residues are also removed by forming coke on the solid catalyst surface. Additionally, the hydrogen content of the product gas can be increased by passing the product gas through the catalyst bed(s), because at the lower temperature end of the catalyst bed a catalytic water-gas-shift reaction ($CO+H_2O \rightarrow CO_2+H_2$) is favoured.

Passing the partially reformed volatiles and/or product gas through the catalyst bed can be performed in a temperature range of from about 1000° C. to about 200° C. Preferably, the temperature of the catalyst bed progressively decreases to about 200° C. in the direction of gas flow.

The gasification system 20 and an apparatus 30 for pyrolysing carbonaceous material for use in the gasification system 20 will now be described with reference to FIGS. 2 and 3.

The gasification system 20 comprises a gasification vessel 21 having four reaction zones integrally defined therein, namely a pyrolysis zone 22, a char gasification zone 23, a reforming zone 25, and a catalyst bed 26. The pyrolysis zone 22 is in fluid communication with the char gasification zone 23 and the reforming zone 25.

In general the gasification vessel 21 is a vertical-sided vessel having a substantially constant cross-sectional area substantially along its entire length and/or along a direction of material and/or fluid flow. Where it would be advantageous to vary the residence time of the material and/or fluid in the vessel 21, and depending on the compositional characteristics of the carbonaceous material, the cross-sectional area of the vessel 21 may be varied along its length and/or along, the direction of material and/or fluid flow. Preferably the vessel 21 is refractory lined.

An upper portion of the gasification vessel 21 is provided with an inlet 28a for introducing a continuous flow of carbonaceous material such as biomass by a feeder 28. The feeder 28 is in fluid communication with the inlet 28a of the vessel, and preferably comprises a rotary feeder to minimise blocking problems. The feeder 28 also preferably comprises an agitator associated with a hopper for storing biomass. The agitator is disposed so as to minimise the potential of biomass bridging in the hopper.

The pyrolysis zone 22 is provided with an apparatus 30 (see FIG. 3) for pyrolysing carbonaceous material. Any suitable pyrolyser such as those known to persons skilled in the art may be employed. Illustrative examples of suitable pyrolysers include, but are not limited to, moving beds, screw/auger/kiln pyrolysers, and a combination of these.

The apparatus 30 can be configured to facilitate the transfer of the carbonaceous material progressively through the pyrolyser into the char gasification zone, either by gravity or mechanical transfer means. Preferably, the apparatus 30 is adapted to retain the carbonaceous material in the pyrolysis zone for a period of sufficient length to substantially convert the carbonaceous material to char and volatiles.

Figure 2:
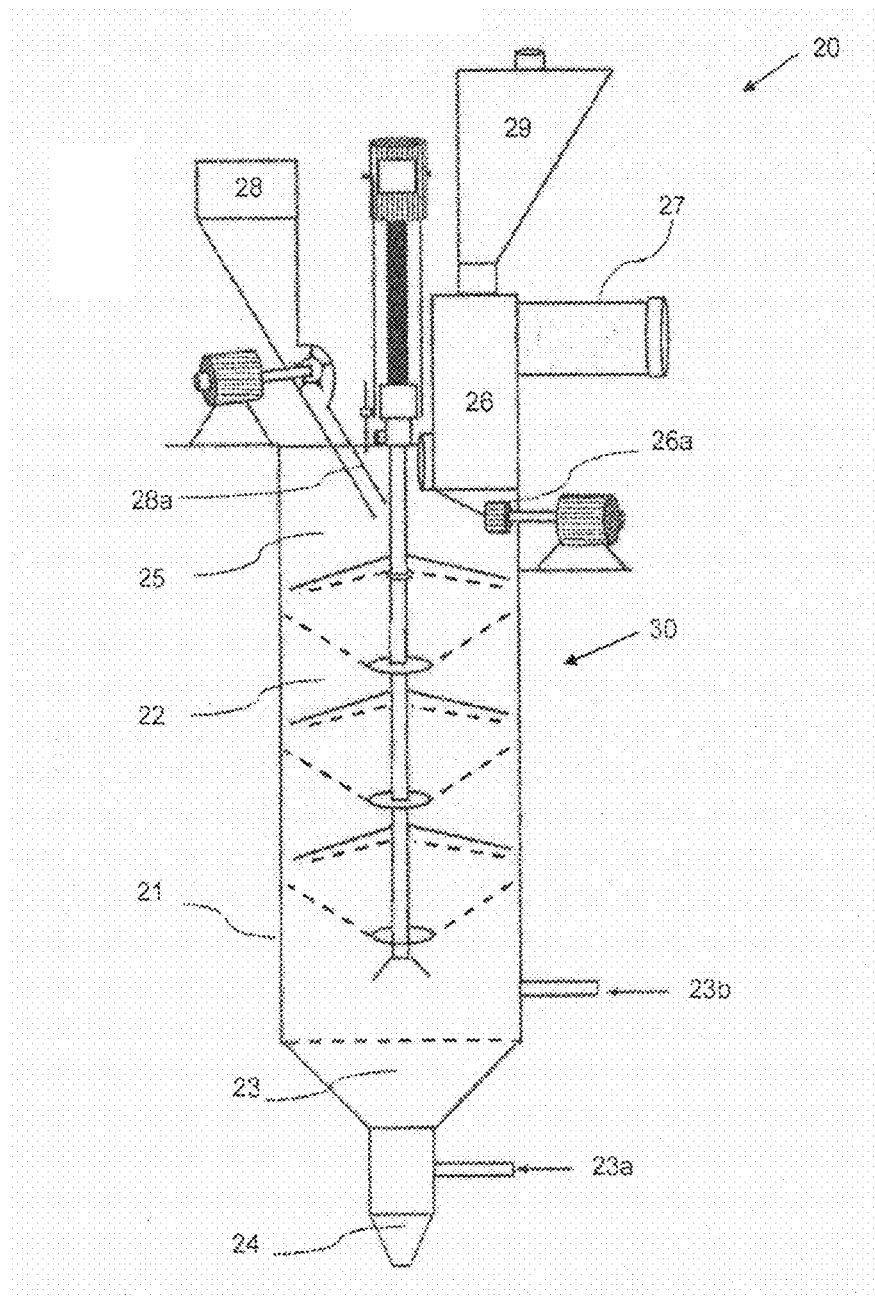
FIG. 2 is a schematic diagram of a gasification system in accordance with one embodiment of the present invention.

In the embodiment shown in FIG. 2, the pyrolysis zone 22 is provided with the apparatus 30 for heating carbonaceous material with a heated gas derived from the char gasification zone 23 to produce volatiles and char. The apparatus 30 is shown in more detail in FIG. 3.

In one preferred form, the apparatus 30 is spaced apart from the char gasification zone 23 and the reforming zone 25 to facilitate effective separation of the resulting char and volatiles produced in the apparatus 30.

The apparatus 30 includes three pairs of conical surfaces 32, 34, 36. It will be appreciated that the number of such conical surfaces may vary. The pairs of conical surfaces 32, 34, 36 are spaced apart from one another and disposed in spaced longitudinal alignment along a length of a rotatable shaft 31. Each pair of conical surfaces 32, 34, 36 comprises an upper inverted conical surface 32a, 34a, 36a spaced apart from a facing lower upright conical surface 32b, 34b, 36b.

Preferably the pairs of conical surfaces 32, 34, 36 comprise perforated metal sheets suitable for the passage of heat, and in particular hot gas therethrough. The metal sheets also function as effective heat conductors for the direct heating of the carbonaceous material.

The lower upright conical surfaces 32b, 34b, 36b are each provided with an opening 32c, 34c, 36c concentrically disposed about the shaft 31. The purpose of the opening 32c, 34c, 36c is to provide for the passage of carbonaceous material from the lower upright conical surfaces 32b, 34b, 36b to the upper inverted conical surfaces 34a, 36a and the char gasification zone 23 disposed immediately beneath.

Additionally, the diameter of the upper inverted conical surface 32a, 34a, 36a is less than the diameter of the facing lower upright conical surface 32b, 34b, 36b. In this way, carbonaceous materials that reside on the upper inverted conical surface 32a, 34a, 36a may slide off the edge of said surface and fail into the facing lower upright conical surface 32b, 34b, 36b disposed immediately beneath.

The apparatus 30 also includes one or more agitation means 32d, 34d, 36d associated with each respective pair of conical surfaces 32, 34, 36. It will be appreciated that the number of agitation means does not have to match the number of pairs of conical surfaces. The agitation means 32d, 34d, 36d in this particular embodiment are rotating arms. The rotating arms are spaced a short distance (e.g., 2-5 mm) above the upper inverted conical surfaces 32a, 34a, 36a and/or above the lower facing upright conical surfaces 32b, 34b, 36b. The agitation means 32d, 34d, 36d are operable by the rotation of the rotatable shaft 31. The rotational speed of shaft 31 may vary, depending on the characteristics of the carbonaceous material, to control the particle residence time in the pyrolysis zone. In one example, the rotating arms rotate at a speed of 12 rpm.

The rotation of the rotatable shaft 31 causes the agitation means 32d, 34d, 36d to disturb particles of carbonaceous material residing on the lower upright conical surfaces 32b, 34b, 36b and cause them to pass through respective openings 32c, 34c, 36c to the inverted conical surfaces immediately therebeneath. Similarly, rotation of the rotatable shaft 31 causes the agitation means 32d, 34d, 36d to disturb particles of carbonaceous material residing on the upper inverted conical surfaces 32a, 34a, 36a and cause them to slide and fall off the edge of said surfaces and be collected in the facing lower upright conical surface 32b, 34b, 36b immediately therebeneath.

The rate of rotation of the shaft may be changed to vary the residence time of the carbonaceous material residing on the upper inverted conical surfaces 32a, 34a, 36a and facing lower upright conical surfaces 32b, 34b, 36b. In this way, the residence time of the carbonaceous material in the apparatus 30 may be controlled to allow a sufficient period for the carbonaceous material to be substantially converted to char and volatiles.

The slope of the conical surfaces may be varied to control the period of time the particles of carbonaceous material reside on said surfaces. Alternatively, the conical surfaces may be rotated relative to the agitation means.

Other suitable methods known to those skilled in the art for controlling the residence time of the carbonaceous material in the apparatus 30 to promote substantially complete pyrolysis of the carbonaceous material to char and volatiles may also be employed in the process and apparatus of the present invention. In addition to pyrolysis reactions, the feedstock would also undergo some extents of gasification within apparatus 30.

The char gasification zone 23 is disposed in a lower portion of the vessel 21. The char gasification zone 23 may be provided with one or more fixed beds or moving beds with grates for supporting char thereon while allowing the oxygen-containing gas and steam to pass through the moving bed(s) and react with the char. Alternatively, the char gasification zone 23 may be provided with a bubbling fluidized bed and a gas distributor to supply the oxygen-containing gas and steam.

In the embodiment shown in FIG. 2, the char is gasified in a conical shaped fixed-bed. The vessel 21 is provided with an oxygen-containing gas inlet 23a and a steam inlet 23b. It is envisaged that air would generally be used for small-scale applications, such as biomass gasification, and that pure or diluted oxygen would be used for large scale applications, such as coal gasification, particularly when the capture and storage of carbon dioxide is intended or when the product gas is used to synthesize liquid fuels and chemicals.

The char gasification zone 23 is further provided with an ash discharging device 24, such as a locked hopper.

The reforming zone 25 is disposed in an upper portion of the vessel 21 and comprises a void defined by the upper portion of the vessel 21 in which gas reforming reactions between volatiles and steam may take place.

The reforming zone 25 is in fluid communication with a catalyst bed 26. Preferably the catalyst bed 26 is a moving bed of solid catalyst or a series of catalyst beds. In one embodiment, the arrangement of the moving bed is such that spent catalyst is discharged into the vessel 21. Accordingly, the catalyst bed 26 is provided with a solid catalyst discharging device 26a to continually replenish the moving bed of solid catalyst as the catalyst is discharged from the catalyst bed 26. The catalyst bed 26 is provided with an outlet 27 for withdrawing product gas.

The solid catalyst in the catalyst bed may take various forms. Char-supported transition metal (e.g. Fe and/or Ni) catalysts are preferred embodiments, which may be produced by pyrolysing and partially gasifying a carbonaceous material (e.g. biomass or brown coal) loaded with transition metals (e.g., Fe and/or Ni). Char itself, without loading metals, can be the catalyst. Alternatively, ilmenite, an iron ore, can also be used as the solid catalyst.

In FIG. 4 there is shown an embodiment of a system 40 for producing product gas and char from a carbonaceous material, in particular biomass. The system 40 is for use with embodiments of the method 10 that comprise the additional step of exposing the product gas and/or partially reformed volatiles to the char. The char produced by the method 10 may be used as activated carbon or as a soil improver and/or for carbon sequestration.

In this example, a feedstock of carbonaceous material with a moisture content up to about 60% in storage 50 is fed into a dryer 52 wherein the moisture of the feedstock is reduced, preferably to a moisture content below about 20% Heat produced from other steps of the process can be used as a heating medium for the dryer 52.

The partially dried feedstock is then fed to the pyrolyser 54 where the feedstock is heated so as to produce char and volatiles. The inventors have shown that pyrolysis of the dried feedstock at a moderate temperature, such as about 450° C. to about 550° C., would release substantial portion of the potential volatiles from the feedstock. In addition, under moderate pyrolysis temperatures, inorganic species, such as AAEM species, tend to be retained in the char. The retention of inorganic species in char is particularly beneficial because it enhances the catalytic activity of the char and facilitates recycling of inorganic nutrients back to the soil in instances wherein biomass may be used as the feedstock and the resultant char is utilized as a soil improver.

The pyrolyser 54 may be configured to facilitate the transfer of the char from the pyrolyser 54 to a reactor 60, either by gravity or mechanical transfer means. Prior to transfer of the char to the reactor 60, the char may be transferred and held temporarily in a storage chamber (not shown) which is in fluid communication with the reactor 60. The storage chamber may be provided with a control means to control a flow rate of char into the reactor 60.

Following pyrolysis, the volatiles are directed to a gas reformer 56. The gas reformer 56 is heated and a desired amount of steam generated in the dryer 52 is introduced together with an oxygen ($O_2$)-containing gas, such as oxygen or air, into gas reformer 56 via respective inlets 56a and 56b where the volatiles undergo gas reforming reactions to produce a raw product gas largely comprising CO and $H_2$.

A portion of the raw product gas and/or char may be directed, as indicated by dashed lines 54a and 56c, to a combustor 58 for combustion to produce a high-temperature gas that may be used for heating the gas reformer 56 and the reactor 60.

Raw product gas produced in the gas reformer 56 is introduced into the reactor 60 which also holds char produced from the pyrolyser 54. The reactor 60 is heated to a temperature up to about 900° C. and the char therein behaves as a solid catalyst so as to catalytically decompose tar residues contained in the raw product gas to form CO, $H_2$ and other combustible gases. Some tar residues are also removed by forming coke on the char surface. Other inorganic contaminants are also removed from the raw product gas by the char. For example, released AAEM species and inorganic particulates may also be caught by the char and other inorganic contaminants such as $NH_3$, $H_2S$ and other N-, Cl- or S-containing compounds are decomposed or adsorbed through contact with the char. In this way, inorganic contaminants such as AAEMs are captured onto the char. Advantageously, the AAEMs enhance the reactivity of char.

The raw product gas may contain excess steam and operating conditions in the reactor 60 are such that, as the raw product gas is brought into contact with the char in the reactor 60, the char may be partially gasified.

Partial gasification of the char in reactor 60 should preferably be performed at a temperature of about 700° C. to about 900° C. Advantageously, these temperatures promote the formation of catalytically active sites on the char for tar residue decomposition and carbon activation.

After partial gasification, the spent char produced by the process of the present invention has a high surface area, typically above about 700 m$^2$ per gram of char. Some possible pollutants (e.g., organics) in the char are also removed in the partial gasification process. Importantly, over this temperature range, the inherent AAEM species in the char are transformed into more leachable forms, which facilitate the recycling of the inorganic nutrients to the field.

The spent char discharged from the reactor 60 is stored in a container 64. The spent char contains abundant AAEM species and other inorganic nutrients, and can be readily returned to the soil as a soil improver. The recycling of the char in this manner has two important advantages: (1) the return of inorganic nutrients in the char to the field, and (2) carbon sequestration, hence reducing carbon emissions in relation to power generation. These factors are important for the sustainable development of rural and regional communities in the long term.

The relative amounts of char and product gas produced by the method 40 (i.e., char-to-product-gas ratio) may be varied. In one embodiment, the reactor 60 comprises a partial gasification zone and a complete gasification zone. The partial gasification zone of the reactor 60 is operated under conditions wherein char is partially gasified to produce product gas and spent char, whereas the complete gasification zone of the reactor 60 is operated under conditions wherein char is gasified to produce product gas and ash. Where a greater volume of clean product gas is required, a larger relative proportion of char may be transferred to the complete gasification zone of the reactor 60. Alternatively, where a greater volume of spent char is required, a larger relative proportion of char may be transferred to the partial gasification zone of the reactor 50.

The system 20 or 40 may be provided with means for establishing, maintaining and/or varying the temperature distribution within the gasification vessel. Such means may include controllers for controlling the feed rates of oxygen-containing gas and/or steam. For example, in order to raise the temperature in the char gasification zone, more oxygen-containing gas may be provided to promote exothermic reactions with char therein.

In some embodiments, the system 20 or 40 further comprises a plurality of sensors and gas and solid sampling probes.

As described above in detail, embodiments of the present invention provide an efficient gasification method, especially for low-rank carbonaceous materials, to manufacture relatively high quality product gas for purposes such as electricity generation, heat production and chemical synthesis.

Embodiments of the present invention also provide solid catalysts capable of removing tar residues, other contaminants and pollutant-forming species from the product gas stream as well as capable of increasing the hydrogen content in the product gas.

It will also be appreciated that the sensible heat of the product gas may be efficiently used in an indirect heat exchange with other process streams in the present invention, such as steam, prior to such streams being introduced into the char gasification zone. Alternatively, the sensible heat of the product gas may be used to dry the carbonaceous material prior to undergoing gasification.

In some embodiments, particularly in the start-up mode of the gasification method 10, the product gas may be combusted in the char gasification zone to raise the operating temperature therein and/or combusted in the reforming zone to raise the temperature therein.

It will be also understood that while the foregoing description refers to specific sequences of method steps, pieces of systems, apparatus and equipment and their configuration are provided for illustrative purposes only and are not intended to limit the scope of the present invention in any way.

Embodiments of the present invention could improve gasification efficiency. The technology can be suitably utilised in, for example, energy and chemical industries, in particular, the inventors propose that embodiments of the present invention are suitable for distributed power generation using biomass of relatively wide particle size distribution.

Advantageously, the method 10 integrates pyrolysis, the reforming of volatiles, the gasification of char and the cleaning of the product gas to give a compact gasifier configuration for improved process efficiency and economy.

It will be readily apparent to a person skilled in the relevant art that some embodiments of the present invention may provide advantages over the prior art including, but not limited to, the following:

- providing a gasification process, especially for gasifying low-rank carbonaceous materials that may be carried out in a single gasification vessel integrating gasification with hot gas cleaning;
- minimising the interactions between volatiles and char during char gasification, leading to an increased rate of char gasification;
- minimising the direct oxygen consumption by volatiles and their reforming products;
- promoting the direct reaction of char with oxygen in the char gasification zone to generate the heat required for various reactions within the gasification vessel, thereby recuperating the thermal energy of the char gasification products in the form of chemical energy as the product gas;
- minimising the overall consumption of oxygen for maximized gasification efficiency;
- minimising the amount of tar residues in the product gas, a problem which commonly arises in the gasification of low-rank carbonaceous materials, by reforming tar residues with a catalyst;
- minimising the volatilization of inorganic species, in particular AAEMs, which are common in low-rank carbonaceous materials;
- removing the volatilised AAEMs and pollutant-forming impurities such as $NH_3$, HCN and $H_2S$ with the catalyst;
- the spent catalyst may be discharged, as a way of disposal, to the char gasification zone and oxidatively gasified, thereby contributing to thermal energy production in the vessel without generating an additional liquid or solid waste stream;
- the catalyst may be used to promote the water-gas-shift reaction thereby increasing the hydrogen content of the final product gas without the conventional problems associated with catalyst deactivation, regeneration and disposal.

Numerous variations and modifications will suggest themselves to persons skilled in the relevant art, in addition to those already described, without departing from the basic inventive concepts. All such variations and modifications are to be considered within the scope of the present invention, the nature of which is to be determined from the foregoing description. For example, it is to be understood that embodiments of this invention are capable of being practiced and carried out in various ways at both small (a few megawatts or less) and large (a few hundred megawatts) scales.

In the description of the invention, except where the context requires otherwise due to express language or necessary implication, the words "comprise" or variations such as "comprises" or "comprising" are used in an inclusive sense, i.e. to specify the presence of the stated features, but not to preclude the presence or addition of further features in various embodiments of the invention.

The invention claimed is:

1. A method of gasifying a carbonaceous material in a single gasification vessel that is coupled with hot gas cleaning, the method comprising the steps of:
   pyrolysing the carbonaceous material to produce volatiles and char; thereafter
   separating the char from the volatiles to minimize volatile-char interactions during the subsequent gasification of char and the subsequent reforming of volatiles;
   gasifying the char in a char gasification zone;
   reforming the volatiles to produce a product gas; and thereafter
   passing partially reformed volatiles and/or product gas through a product gas cleaning zone comprising a catalyst bed to remove organic and inorganic contaminants;
   wherein the single gasification vessel has a pyrolysis zone, the char gasification zone, and a reforming zone; wherein the pyrolysis zone is disposed intermediate to the reforming zone and the char gasification zone for the volatiles from the pyrolysis zone to ascend into the reforming zone, and wherein hot gas resulting from the gasification zone provides a heat source for pyrolysing the carbonaceous material in the pyrolysis zone.

2. The method of claim 1, wherein the catalyst bed comprises a moving bed of solid catalyst.

3. The method of claim 1, wherein the product gas cleaning zone comprises a plurality of catalyst beds arranged in series.

4. The method of claim 1, wherein the catalyst bed comprises char, a char-supported catalyst or ilmenite.

5. The method of claim 4, wherein, when the catalyst bed comprises char or a char-supported catalyst, the char or char-supported catalyst is prepared from the pyrolysis and/or partial gasification of the carbonaceous material.

6. The method of claim 4, wherein the method further comprises discharging spent char or char-supported catalyst from the catalyst bed and gasifying the spent char or char-supported catalyst.

7. The method of claim 1, wherein the step of pyrolysing the carbonaceous material comprises pyrolysing the carbonaceous material for a period of sufficient length to convert substantially all the carbonaceous material to volatiles and char.

8. The method of claim 1, wherein the step of pyrolysing the carbonaceous material comprises heating the carbonaceous material with a counter-current stream of hot gas.

9. The method of claim 8, wherein the hot gas is produced in the char gasification zone.

10. The method of claim 8, wherein the hot gas is produced from combusting product gas in the char gasification zone or the reforming zone.

11. The method of claim 1, wherein the step of gasifying the char comprises reacting the char with a controlled amount of an oxygen-containing gas.

12. A gasification system for gasifying a carbonaceous material, the gasification system comprising a single gasification vessel that is coupled with hot gas cleaning, wherein the single gasification vessel comprises:
   a reforming zone for reforming volatiles to produce a product gas;
   a char gasification zone for gasifying char;
   a pyrolysis zone for pyrolysing carbonaceous material, the pyrolysis zone being in fluid communication with the reforming zone and the char gasification zone in an arrangement whereby volatiles and char formed in the pyrolysis zone are separated and directed to the reforming zone and the char gasification zone, respectively, to minimize volatile-char interactions during the subsequent gasification of char and the subsequent reforming of volatiles;
   wherein hot gas resulting from the gasification zone provides a heat source for pyrolysing the carbonaceous material in the pyrolysis zone; and
   a product gas cleaning zone in fluid communication with the reforming zone in an arrangement whereby partially reformed volatiles and/or product gas are passed through a catalyst bed in the product gas cleaning zone to remove organic and inorganic contaminants.

13. The system of claim 12, wherein the catalyst bed is selected from one of a char and a char-supported catalyst.

14. The system of claim 12, wherein the char gasification zone is disposed in a lower portion of the gasification vessel.

15. The system of claim 12, wherein the reforming zone is disposed in an upper portion of the gasification vessel.

16. The system of claim 12, wherein the pyrolysis zone is configured to retain the carbonaceous material in the pyrolysis zone for a residence time of sufficient length to convert substantially all the carbonaceous material to volatiles and char.

17. The system of claim 12, wherein the system is configured such that a portion of the char formed in the pyrolysis zone is separated from the remaining carbonaceous material as a gas cleaning catalyst and directed to the product gas cleaning zone.

18. The system of claim 12, wherein the gasification system is provided with a char storage zone disposed intermediate to the pyrolysis zone and the product gas cleaning zone, and a control system associated therewith, the control system being arranged, in use, to control a flow rate of char to the product gas cleaning zone.

19. An apparatus for pyrolysing and at least partially gasifying carbonaceous materials, the apparatus comprising:
   at least one element having a surface arranged such that, when the apparatus receives carbonaceous material, the received carbonaceous material is in contact with the surface for a time period of sufficient length so as to pyrolyse the carbonaceous material;
   wherein the apparatus is arranged such that the surface receives heat for pyrolysing and partially gasifying the carbonaceous material; and
   wherein hot gas resulting from gasifying the carbonaceous material provides the heat for pyrolysing the carbonaceous material.

20. The apparatus of claim 19, wherein the surface has a downwardly sloping portion arranged so as to assist in contacting the carbonaceous material with the surface for the time period.

21. The apparatus of claim 19, comprising a plurality of elements, each having a respective surface and being arranged such that the surfaces are in a cascade arrangement, wherein the pyrolyser is arranged such that carbonaceous material is transferred to successive surfaces of the cascade arrangement after a period of time of sufficient length so as to pyrolyse and partially gasify the carbonaceous material.

22. The apparatus of claim 19, wherein the apparatus comprises an agitator associated with the at least one element, the agitator being arranged so as to agitate carbonaceous material in contact with the surface so as to transfer the carbonaceous material to a region below the surface.

23. The apparatus of claim 22, comprising a plurality of elements, each having a respective surface and being arranged such that the plurality of surfaces are arranged in a vertical cascade arrangement, the apparatus further comprising a rotatable shaft extending vertically through the plurality of surfaces wherein agitators associated with respective surfaces are operable by rotation of the rotatable shaft.

24. The method of claim 1, wherein the step of pyrolysing the carbonaceous material is performed using a pyrolyser.

25. The system of claim 12, wherein the pyrolysis zone comprises a pyrolyser arranged to pyrolyse the carbonaceous material.

26. The method of claim 1, wherein the passing step removes tar.

27. The system of claim 12, wherein the organic and inorganic contaminants removed by the catalyst bed include tar.

\* \* \* \* \*